US012360484B2

(12) United States Patent
Ogawa

(10) Patent No.: US 12,360,484 B2
(45) Date of Patent: Jul. 15, 2025

(54) IMAGE FORMING APPARATUS

(71) Applicant: CANON KABUSHIKI KAISHA, Tokyo (JP)

(72) Inventor: Kosuke Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/626,598

(22) Filed: Apr. 4, 2024

(65) Prior Publication Data

US 2024/0345525 A1 Oct. 17, 2024

(30) Foreign Application Priority Data

Apr. 11, 2023 (JP) ................................ 2023-064522

(51) Int. Cl.
*G03G 15/08* (2006.01)
*G03G 15/00* (2006.01)
*G03G 15/06* (2006.01)

(52) U.S. Cl.
CPC ......... *G03G 15/556* (2013.01); *G03G 15/065* (2013.01); *G03G 15/5008* (2013.01)

(58) Field of Classification Search
CPC . G03G 15/065; G03G 15/5008; G03G 15/556
USPC ................................................ 399/9, 24, 27
See application file for complete search history.

(56) References Cited

U.S. PATENT DOCUMENTS 7,899,343 B2 * 3/2011 Fujioka .............. G03G 15/0853 399/12
8,805,213 B2 * 8/2014 Hikosaka ........... G03G 15/5062 399/27
10,331,070 B2 6/2019 Tanaka

FOREIGN PATENT DOCUMENTS

JP 2009-075574 A 4/2009
JP 2012-189841 A 10/2012
JP 2019-008192 A 1/2019
JP 2021-002015 A 1/2021

* cited by examiner

*Primary Examiner* — Hoan H Tran
(74) *Attorney, Agent, or Firm* — Venable LLP

(57) ABSTRACT

An image forming apparatus is provided, which includes: a photosensitive drum that bears an electrostatic latent image; a charging roller that charges the photosensitive drum; and a developing roller that develops by toner the electrostatic latent image formed on the photosensitive drum, a control unit that controls to start rotation of the photosensitive drum and the developing roller in a state of being in contact with each other, and an estimating unit configured to estimate a value relating to an amount of toner consumption in the image forming apparatus, on the basis of a value relating to an amount of toner that is consumed in a case in which the photosensitive drum and the developing roller are driven in the state of being in contact with each other at a time of startup of the image forming apparatus.

20 Claims, 11 Drawing Sheets

| | | ENVIRONMENT | RUBBING COUNT | | | |
|---|---|---|---|---|---|---|
| | | | RUBBING COUNT 1 | RUBBING COUNT 2 | RUBBING COUNT 3 | ··· |
| STOPPED TIME | STOPPED TIME 1 | ENVIRONMENT 1 | COEFFICIENT 1 | COEFFICIENT 2 | COEFFICIENT 3 | ··· |
| | | ENVIRONMENT 2 | COEFFICIENT 5 | COEFFICIENT 6 | COEFFICIENT 7 | ··· |
| | | : | : | : | : | ··· |
| | STOPPED TIME 2 | ENVIRONMENT 1 | COEFFICIENT 13 | COEFFICIENT 14 | COEFFICIENT 15 | ··· |
| | | ENVIRONMENT 2 | COEFFICIENT 17 | COEFFICIENT 18 | COEFFICIENT 19 | ··· |
| | | : | : | : | : | ··· |
| | : | ENVIRONMENT 1 | COEFFICIENT 25 | COEFFICIENT 26 | COEFFICIENT 27 | ··· |
| | | ENVIRONMENT 2 | COEFFICIENT 29 | COEFFICIENT 30 | COEFFICIENT 31 | ··· |
| | | : | : | : | : | ··· |

Fig.7

| SEQUENCE TYPE | COEFFICIENT |
|---|---|
| SEQUENCE 1 | COEFFICIENT 1 |
| SEQUENCE 2 | COEFFICIENT 2 |
| SEQUENCE 3 | COEFFICIENT 3 |
| SEQUENCE 4 | COEFFICIENT 4 |
| : | : |

*Fig.10*

IMAGE FORMING APPARATUS

BACKGROUND OF THE INVENTION

Field of the Invention

The present invention relates to an image forming apparatus.

Description of the Related Art

In an image forming apparatus that uses an electrophotographic process, an image bearing member such as a photosensitive drum or the like is charged by a charging roller, an electrostatic latent image is formed by a laser scanner, and toner is transferred onto the photosensitive drum by a potential difference between a developing roller and the photosensitive drum. There is technology for controlling the potential difference between the developing roller and the photosensitive drum to be within a predetermined range, so that, in sites other than an image forming portion, toner on the developing roller is not transferred onto the photosensitive drum. In a case in which the potential difference is not within the predetermined range, the toner readily adheres to non-image regions, which is a factor in increased toner consumption amounts.

Also, there is technology for accumulating the toner consumption amount and estimating the remaining toner amount, so as to perform notification of reduced remaining toner amount to a user at an appropriate timing. In the estimation of toner consumption amount, there is a need to take into account an amount of toner consumption due to fogging, in addition to an amount of the toner consumption due to image formation. There is a correlation between the amount of toner consumption due to fogging when performing image formation (hereinafter referred to as "fogging toner amount") and potential difference between charging potential of the photosensitive drum and developing bias potential. Japanese Patent Application Publication No. 2012-189841 discloses technology for estimating the fogging toner amount when performing image formation on the basis of this potential difference.

In an image forming apparatus in which driving is started in a state in which the photosensitive drum and the developing roller are in contact, fogging toner is observed in operations other than image formation, such as at the time of startup of the image forming apparatus and so forth. Accordingly, there is a likelihood that simply estimating the fogging toner amount occurring when performing image formation cannot precisely estimate the amount of toner consumption, and hence the amount of remaining toner.

SUMMARY OF THE INVENTION

The present invention precisely estimates the amount of toner consumption in an image forming apparatus in which driving is performed in a state in which the photosensitive drum and the developing roller are in contact in operations other than when performing image formation.

One aspect of the present invention is an image forming apparatus including:

- a photosensitive drum that bears an electrostatic latent image;
- a charging roller that charges the photosensitive drum;
- a developing roller that develops by toner the electrostatic latent image formed on the photosensitive drum;

- a control unit that controls to start rotation of the photosensitive drum and the developing roller in a state of being in contact with each other; and
- an estimating unit configured to estimate a value relating to an amount of toner consumption, wherein
- the estimating unit estimates the value relating to the amount of toner consumption on the basis of a value relating to an amount of toner that is consumed in a case in which the photosensitive drum and the developing roller are driven in the state of being in contact with each other at a time of startup of the image forming apparatus.

Another aspect of the present invention is an image forming apparatus including:

- a photosensitive drum that bears an electrostatic latent image;
- a charging roller that charges the photosensitive drum;
- a developing roller that develops by toner the electrostatic latent image formed on the photosensitive drum;
- a control unit that controls to start rotation of the photosensitive drum and the developing roller in a state of being in contact with each other; and
- an estimating unit configured to estimate a value relating to an amount of toner consumption, wherein
- the estimating unit estimates the value relating to the amount of toner consumption, on the basis of a value relating to an amount of toner that is consumed in a case in which the photosensitive drum and the developing roller are driven in the state of being in contact with each other at a time of rotation after an image forming operation onto a recording medium ends.

According to the present invention, the toner consumption amount in an image forming apparatus in which driving is performed in a state in which the photosensitive drum and the developing roller are in contact, in operations other than when performing image formation, can be precisely estimated.

Further features of the present invention will become apparent from the following description of exemplary embodiments with reference to the attached drawings.

BRIEF DESCRIPTION OF THE DRAWINGS

FIG. 7 is a selection table for coefficient $\alpha\mathbf{1}$ in the second embodiment;

FIG. 10 is a selection table for coefficient α2 in the fourth embodiment.

DESCRIPTION OF THE EMBODIMENTS

Forms for carrying out the invention will be exemplarily described in detail below by way of embodiments, with reference to the drawings. Note, however, that dimensions, materials, forms, and other relative layouts and so forth of components described in the embodiments are not intended to limit the scope of the invention thereto, unless specific description is made to that effect.

A feature of an image forming apparatus described in the following embodiments is to precisely estimate remaining toner amount, by adding fogging toner amount when not performing image formation, to a toner consumption amount when performing image formation. Another feature is to take into consideration whether or not falling control was correctly performed a previous time, when performing the estimation of the fogging toner amount when not performing image formation. Examples of when not performing image formation including at the time of startup of the image forming apparatus (first and second embodiments), at the time of rising control of voltage of a charging roller and a developing roller (third embodiment), and at the time of falling control (fourth embodiment).

First Embodiment

A method of estimating fogging toner amount that is consumed at the time of startup of the image forming apparatus, in accordance with a stopping factor the previous time, will be described in the first embodiment.

Configuration of Image Forming Apparatus

Figure 1:
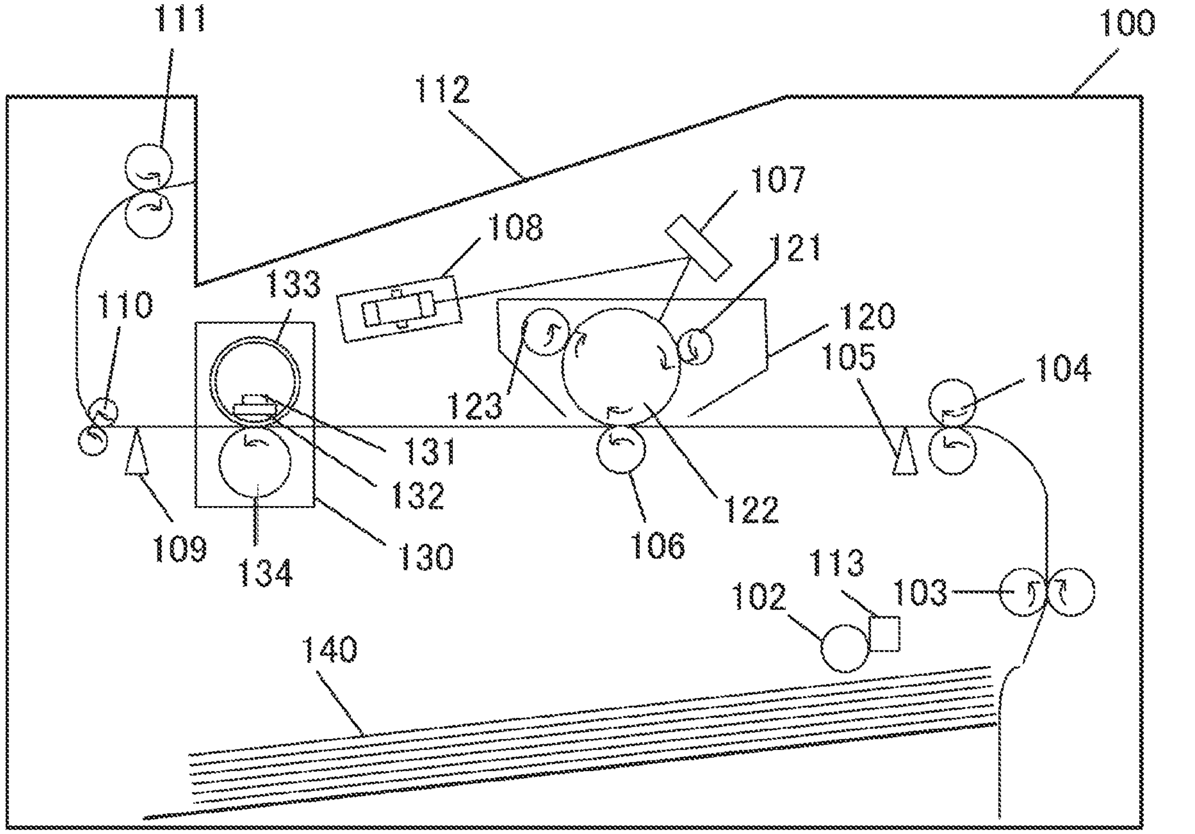
FIG. 1 is a schematic configuration diagram of an image forming apparatus according to an embodiment.

FIG. 1 is a schematic diagram illustrating an overall configuration of the image forming apparatus 100 according to the first embodiment. The image forming apparatus 100 has a process cartridge 120 that is detachably attachable to the image forming apparatus 100. Laid out within the process cartridge 120 are a photosensitive drum 122 made of an organic photosensitive material or an amorphous silicon photosensitive material, a charging roller 123, and a developing roller 121. The photosensitive drum 122 is an image bearing member that bears electrostatic latent images. A surface of the photosensitive drum 122 is uniformly charged to a predetermined potential (e.g., −400 V) by the charging roller 123. The charging roller 123 is a charging unit for charging the photosensitive drum 122. The developing roller 121 is a developing unit for developing an electrostatic latent image formed on the photosensitive drum 122 by toner.

A laser beam emitted by a scanner unit 108 is reflected by a laser-reflecting mirror 107, and is cast on the photosensitive drum 122, whereby exposed portions of the photosensitive drum 122 transition to a predetermined exposure potential (e.g., −100 V), thus forming an electrostatic latent image. The developing roller 121 outputs a predetermined voltage (e.g., −250 V), and supplies toner of which charging polarity is negative polarity to the electrostatic latent image formed on the photosensitive drum 122, thereby forming a toner image. In the first embodiment, the developing roller 121 and the photosensitive drum 122 are configured to be driven in a state of being in contact at all times, without being separated (hereinafter referred to as "configuration without development contact and separation mechanism").

Also, one sheet of a recording medium that is situated on the top of a bundle of recording medium 140 is fed out from a cassette by a sheet feed roller 102, by a sheet feed solenoid 113 being driven when performing image formation. The recording medium 140 is transported by transport rollers 103 and registration rollers 104 and is transported to a nip portion formed between the photosensitive drum 122 and a transfer roller 106. A registration sensor 105 detects a leading edge and a trailing edge of the recording medium.

The transfer roller 106 applies a predetermined voltage and supplies a charge to the recording medium 140 transported to the nip portion between the photosensitive drum 122 and the transfer roller 106, from a rear face of the recording medium 140, thereby transferring the toner image on the photosensitive drum 122 onto the recording medium 140. The application voltage of the transfer roller 106 is, for example, +1500 V.

Description of Functional Configuration of Image Forming Apparatus

A functional configuration of the image forming apparatus 100 will be described with reference to FIG. 2. A controller 201 is mutually communicable with a host computer 200 and an engine control unit 202. Upon print data being input from the host computer 200, the controller 201 renders the print data, and performs conversion thereof into image data for image formation. The controller 201 then generates video signals for exposure, in order to perform exposure on the basis of the image data. Upon generation of the video signals being completed, the controller 201 instructs a video interface unit 210 of the engine control unit 202 to start image formation under command. Thereafter, upon receiving the instruction to start image formation from the video interface unit 210, a central processing unit (CPU) 220 starts various types of actuators, such as a main motor 250 and so forth, and starts preparation for image formation. Upon the preparation of image formation being completed, the engine control unit 202 starts output of a/BD signal serving as a reference timing for output of the video signals to the controller 201, and sequentially executes the above image forming operations.

The engine control unit 202 starts up the main motor 250 that serves as a drive source when performing image formation. The rollers relating to transportation of the recording medium 140 (sheet feed roller 102, transport rollers 103, registration rollers 104, transfer roller 106, sheet discharge rollers 110, FD rollers 111) are driven, thereby controlling transportation of the recording medium 140. The registration sensor 105 measures intervals between the recording mediums 140 on the basis of detection timings of the leading edge and the trailing edge of the recording medium 140 during transportation of the recording medium 140. For example, the next sheet feed timing is decided from the recording medium length and the nominal sheet interval, and the sheet feed solenoid 113 is driven at this sheet feed timing to feed the recording medium 140.

Also, a voltage control unit 230 controls application of voltage to the charging roller 123, the developing roller 121, and the transfer roller 106. The voltage control unit 230 performs voltage control in operations of image formation on the photosensitive drum 122 (formation of electrostatic latent image and toner image), and operations of image formation onto the recording medium 140 (transfer). In addition to these, the voltage control unit 230 also performs rising operations of starting charging of the surface of the photosensitive drum 122 by the charging roller 123 as preparation for such image formation, and falling operations after image formation ends. The rising operations and the falling operations will be described later.

The voltage control unit 230 uniformly charges the surface of the photosensitive drum 122 to a charging potential VH by the charging roller 123. Upon a predetermined discharge start voltage being applied to the charging roller 123, discharge occurs in a minute space formed upstream and downstream of a nip portion where the photosensitive drum 122 and the charging roller 123 come into contact. When charge generated at the time of discharging moves to the photosensitive drum 122 and is charged thereto, potential difference between the photosensitive drum 122 and the charging roller 123 is lost and discharging stops. Thus, the surface of the photosensitive drum 122 is controlled to the target charging potential VH. In the first embodiment, the discharge start voltage will be assumed to be −600 V. Note that this discharge start voltage is an example.

Thereafter, the surface of the photosensitive drum 122 is irradiated by a laser beam by the scanner unit 108, thereby generating exposure potential VL on the surface of the photosensitive drum 122. The region of the exposure potential VL on the photosensitive drum 122 forms an image portion, and the region of the charging potential VH forms a non-image portion. A potential difference between a developing bias potential Vdc applied to the developing roller 121 and the charging potential VH (non-image portion) will be referred to as a first potential difference, and a potential difference between the developing bias potential Vdc and the exposure potential VL (image portion) as a second potential difference. With the first potential difference as Vback, when Vback deviates from a predetermined potential difference, so-called fogging, in which toner adheres to the non-image region, occurs more readily. Fogging occurring in the non-image region leads to consumption of toner that initially was not anticipated.

Note that fogging includes regular fogging due to toner that is charged to regular polarity (negative polarity in the first embodiment, negative toner), and inverse fogging due to toner that is charged to inverse polarity (positive polarity in the first embodiment, positive toner). Occurrence of regular fogging and inverse fogging is dependent on environmental conditions such as humidity, temperature, and so forth, degree of deterioration of toner, equipment configuration, and so forth.

In the image forming apparatus 100 according to the first embodiment in which the photosensitive drum 122 and the developing roller 121 are driven in a state of being in contact when not performing image formation, fogging of toner can occur besides fogging of toner occurring in the non-image region at the time of image formation. For example, fogging of toner occurs at the time of startup of the image forming apparatus 100 at the time of executing rising operations and falling operations, and also when not performing image formation relating to preparatory operations, such as when performing rotations after ending image formation, which will be described later. In the first embodiment, values relating to toner consumption amount in the image forming apparatus 100 are estimated on the basis of values relating to fogging toner amount in a case of driving the photosensitive drum 122 and the developing roller 121 in such a state of being in contact at the time of startup.

The time of startup of the image forming apparatus 100 may be, for example, a period from the timing of the power of the image forming apparatus 100 that is in a power-off state being turned on, until transitioning to a state in which the image forming apparatus 100 is capable of image forming operations. Also, the time of startup of the image forming apparatus 100 may be, for example, a period from the timing of the power of the image forming apparatus 100 that is in a power-off state being turned on and application of charging bias to the charging roller 123 being started, until transitioning to a state in which image forming operations can be performed. Also, the time of startup may be, for example, a period of the image forming apparatus 100 in a state in which the power is on transitioning from an input standby state for image data to a state in which image forming operations can be performed. Also, the time of startup may be a period following starting of rotation of the main motor 250, for example, until a position on the photosensitive drum 122 that is charged to a potential capable of image formation by rising control reaches a position of the developing roller 121.

In such a time of startup, the image forming apparatus 100 according to the first embodiment starts rotational driving in a state in which the photosensitive drum 122 and the developing roller 121 are in contact. Accordingly, depending on the potential state of the surface of the photosensitive drum 122 at the time of starting rotational driving, there is a likelihood of unanticipated fogging by toner occurring. For example, in a case in which predetermined processing for transitioning from a state in which image forming operations can be performed to a standby state or a power off state was not performed when the power was turned off or image forming operations ended the previous time, and moreover the stopped time is short, the state of charging of the surface of the photosensitive drum 122 is in a non-anticipatable state. Accordingly, fogging of toner of an amount that is not anticipatable may occur at the time of startup.

An exposure control unit 240 performs settings with respect to the scanner unit 108 and performs control to expose the photosensitive drum 122 with a predetermined amount of light.

A consumed-toner amount calculating unit 270 is an estimating unit for estimating the toner consumption amount at the developing roller 121. When image formation is performed, the consumed-toner amount calculating unit 270 calculates the toner consumption amount when performing image formation, from information based on image data. Also, the consumed-toner amount calculating unit 270 has a fogging toner amount estimating unit 271 that estimates a fogging toner amount consumed when not performing image formation. In the first embodiment, the fogging toner amount estimating unit 271 estimates the fogging toner amount at the time of startup of the image forming apparatus 100, for when not performing image formation. The consumed-toner amount calculating unit 270 calculates the toner consumption amount on the basis of the toner consumption amount when performing image formation, and the fogging toner amount that is consumed in a case of driving in a state in which the photosensitive drum 122 and the developing roller 121 are in contact when not performing image formation. The consumed-toner amount calculating unit 270 writes the toner consumption amount that is calculated into nonvolatile memory 124 that is provided to the process cartridge 120. Accordingly, a cumulative value of toner consumption amount from the point at which the process cartridge 120 is a new product, is stored in the nonvolatile memory 124. Note that the cumulative value of the toner consumption amount may be stored in nonvolatile memory 260 of the engine control unit 202. Note that the fogging toner amount estimating unit 271 may further estimate the fogging toner amount that is consumed by adhering to the non-image forming region of the recording medium 140 when performing image formation. In this case, the consumed-toner amount calculating unit 270 may calculate the toner consumption amount on the basis of the toner amount that is consumed in the image region and the fogging toner amount that adheres to the non-image forming region, when performing image formation, and the fogging toner amount when not performing image formation.

The consumed-toner amount calculating unit 270 estimates the remaining toner amount in the process cartridge 120 on the basis of the cumulative value of toner consumption amount, and an initial toner amount accommodated in the process cartridge 120 when a new product. The CPU 220 performs control to notify the user of reduced remaining toner amount when the remaining toner amount that is estimated is below a predetermined threshold value. Various types of known methods may be used as the method of notification.

Figure 2:
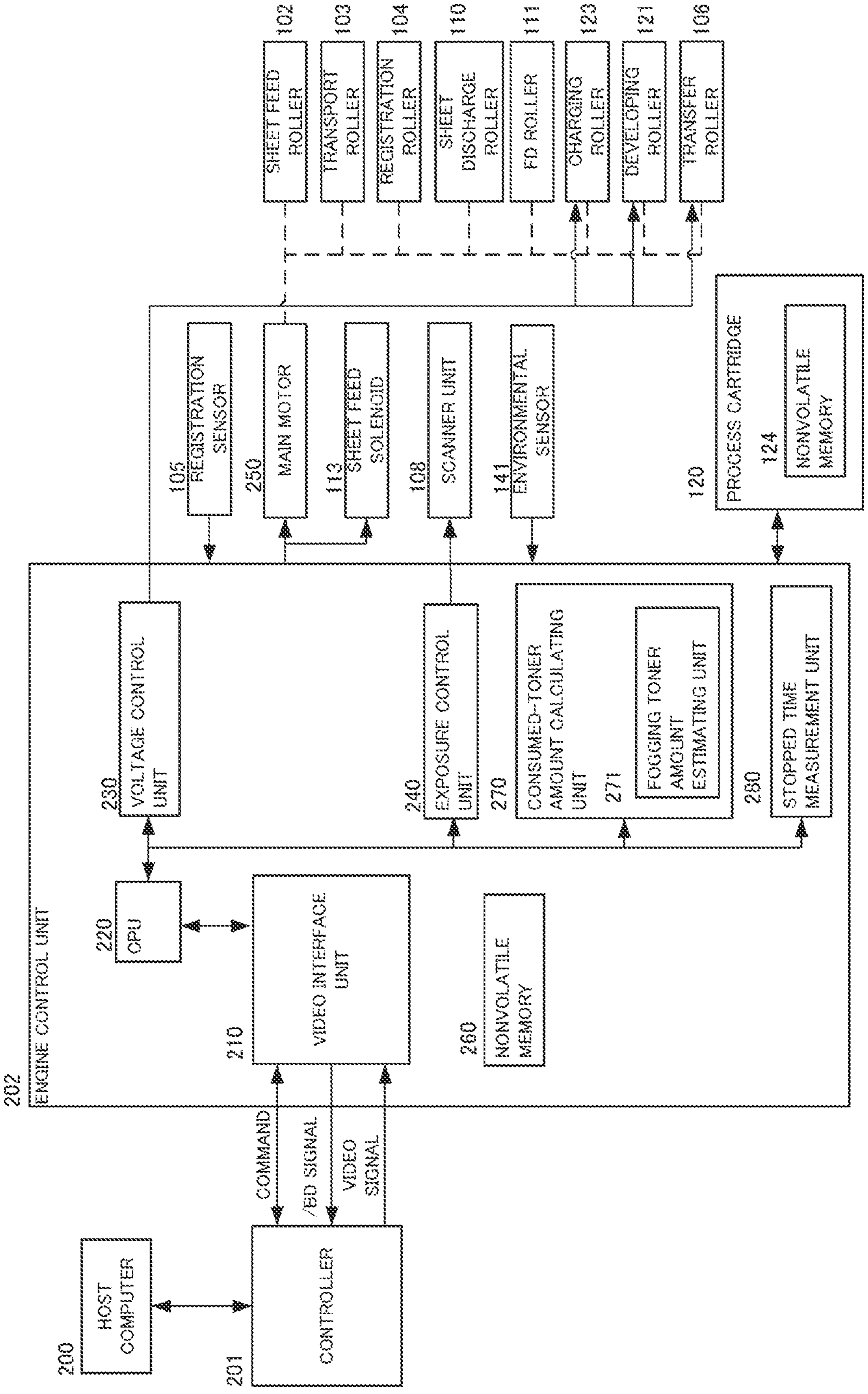
FIG. 2 is a block diagram illustrating functional configurations of the image forming apparatus according to the embodiment.

Note that an environmental sensor 141 and a stopped time measurement unit 280 in FIG. 2 are configurations relating to the second embodiment that will be described later.

Rising Control and Falling Control

In the image forming apparatus 100, rising control for controlling the voltage applied to the charging roller 123 and the developing roller 121, in order to transition the charging roller 123 and the developing roller 121 that are in a standby state to a state of being capable of image formation is performed. Also, falling control for controlling the voltage applied to the charging roller 123 and the developing roller 121, in order to transition the charging roller 123 and the developing roller 121 that are in a state of being capable of image formation to a standby state is performed. The rising control is performed before starting image forming operations, and the falling control is performed after ending image forming operations, by the voltage control unit 230. In the rising control and the falling control according to the first embodiment, the voltage applied to the charging roller 123 and the developing roller 121 is changed stepwise to a target voltage. The rising control and the falling control according to the first embodiment will be described below.

In the image forming apparatus according to the first embodiment, the potential at which image formation can be performed (at which an electrostatic latent image can be formed and developed by toner) is −400 V at the photosensitive drum 122 and −250 V at the developing roller 121. Accordingly, a first potential difference Vback between the photosensitive drum 122 and the developing roller 121 in a state in which image formation can be performed is 150 V. In a state in which surface potential of the photosensitive drum 122 is 0 V, when the voltage of the charging roller 123 is a negative value of which the absolute value is greater than −600 V, which is a discharge start voltage, the surface potential of the photosensitive drum 122 starts to change from 0 V. In order to charge the photosensitive drum 122 to −400 V, the voltage of the charging roller 123 needs to be output at −1000 V.

In a state in which the photosensitive drum 122 and the developing roller 121 can perform image formation, even when no electrostatic latent image is formed on the surface of the photosensitive drum 122, minute amounts of toner move from the developing roller 121 to the photosensitive drum 122, resulting in fogging toner. In the image forming apparatus 100 according to the first embodiment, in a case in which the first potential difference Vback is around 150 V (e.g., 150 V±100 V), the fogging toner amount is the smallest. When the first potential difference Vback greatly changes from 150 V, the amount of fogging toner increases. In a case of raising the voltage of the charging roller 123 and the voltage of the developing roller 121 all at once to voltages at which image formation can be performed, the difference in the amount of time necessary for rising of voltage of each can cause a period in which the first potential difference Vback greatly exceeds 150 V. In this case, there is a likelihood that the fogging toner amount during rising will become great.

Accordingly, in order to suppress the first potential difference Vback from greatly deviating from 150 V during rising of the voltages of the charging roller 123 and the developing roller 121, the voltages of the charging roller 123 and the developing roller 121 are both raised stepwise. In the first embodiment, the voltages of the charging roller 123 and the developing roller 121 are each made to change to the target value in four stages of 100 V each. Note that voltage is changed stepwise in the same way, at the time of the voltages of the charging roller 123 and the developing roller 121 falling.

Rising control and falling control of the charging roller 123 and the developing roller 121 according to the first embodiment will be described with reference to FIGS. 3A to 3D.

Figure 3A:
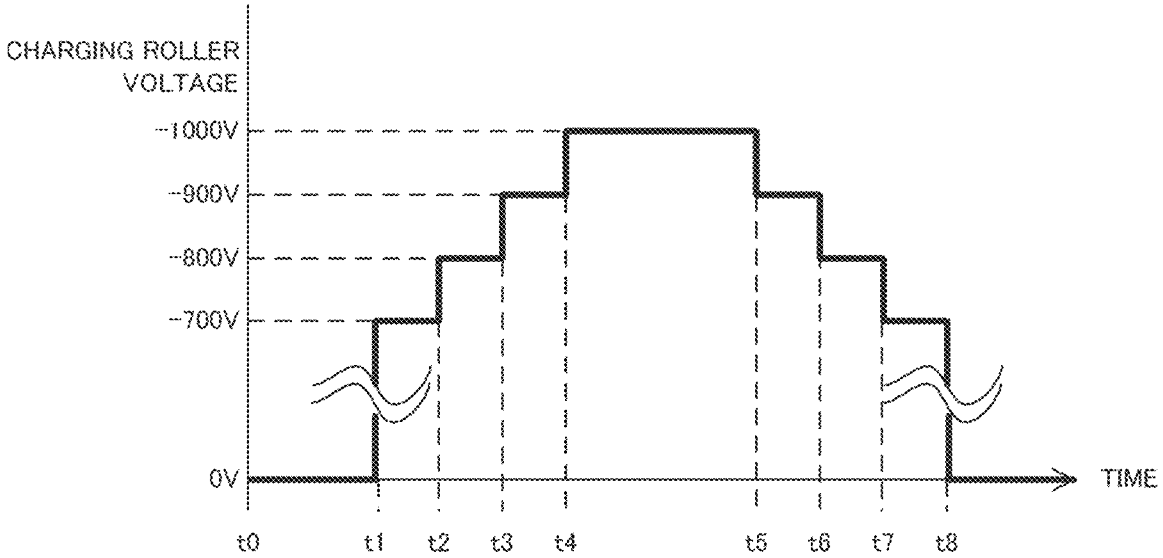
FIGS. 3A and 3B are timing charts showing voltage control of a charging roller according to the embodiment.
Figure 3B:
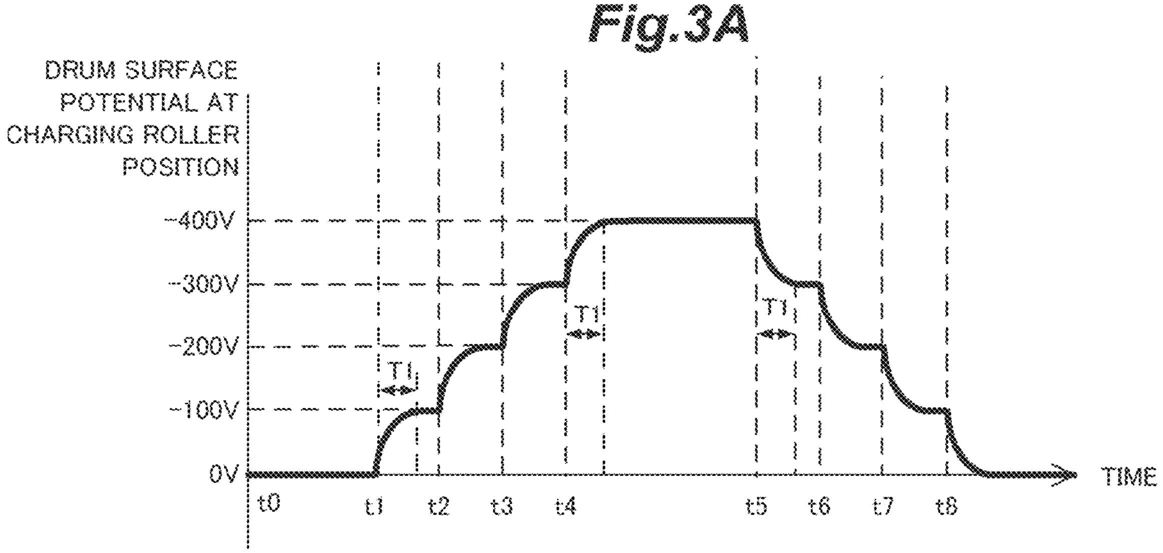

FIGS. 3A and 3B show change in voltage in a case of stepwise rising of the surface potential of the photosensitive drum 122 from 0 V (time t1) to −400 V at which image formation can be performed (time t4). Also, FIGS. 3A and 3B show change in voltage in a case of subsequent falling of the surface potential of the photosensitive drum 122, from the state at which image formation can be performed, to 0 V again (time t8). FIG. 3A shows change in the voltage of the charging roller 123, and FIG. 3B represents change in surface potential of the photosensitive drum 122 at the position of the charging roller 123, in which the vertical axis represents voltage or potential, and the horizontal axis represents time.

At the point of origin (time t0) in the timing charts of FIGS. 3A and 3B, voltage of the charging roller 123 is not applied, and the surface potential of the photosensitive drum 122 is also 0 V. At time t1, initial application of voltage from the charging roller 123 is started, and the value thereof is −700 V. Subsequently, at time t2 after an amount of time T1 has elapsed from time t1, the voltage of the charging roller 123 is changed by 100 V, and the voltage of the charging roller 123 is set to −800 V. Subsequently, at time t3 after an amount of time T1 has elapsed from time t2, the voltage of the charging roller 123 is set to −900 V. In the same way, at time t4 after an amount of time T1 has elapsed from time t3, the voltage of the charging roller 123 is set to −1000 V, and preparation at the charging roller 123 for realizing a state in which image formation can be performed is completed. At this time, the surface potential of the photosensitive drum 122 at the position of the charging roller 123 changes to −100 V by the timing of the amount of time T1 elapsing from time t1, as shown in FIG. 3B. Thereafter, the surface potential of the photosensitive drum 122 changes in 100 V steps in accordance with the stepwise increase in output of the charging roller 123, and changes to −400 V, which is the target value, by the timing at which the amount of time T1 elapses from time t4.

Figure 3C:
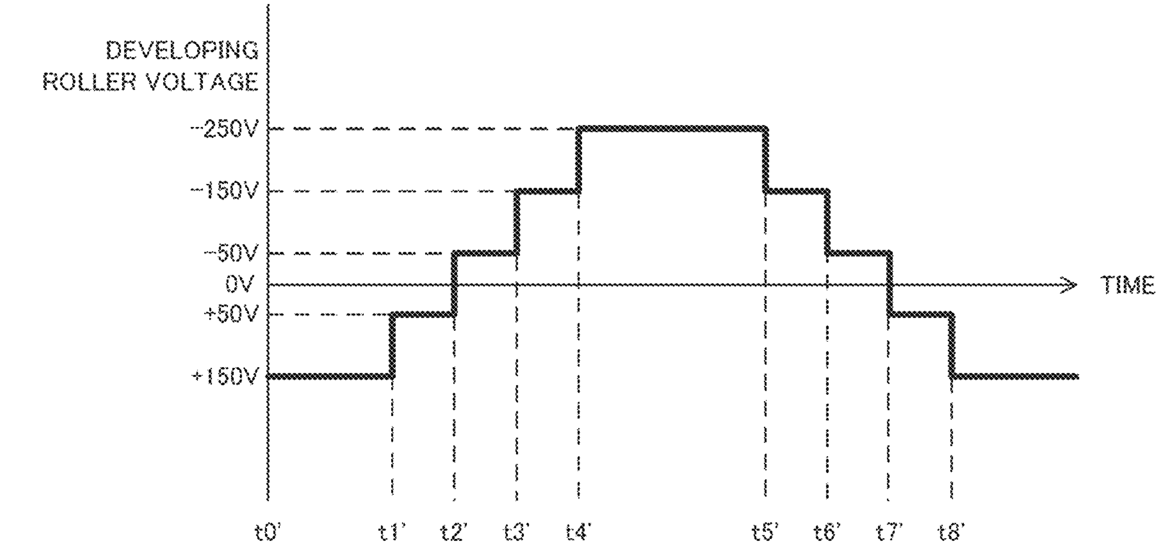
FIGS. 3C and 3D are timing charts showing voltage control of a developing roller according to the embodiment.
Figure 3D:
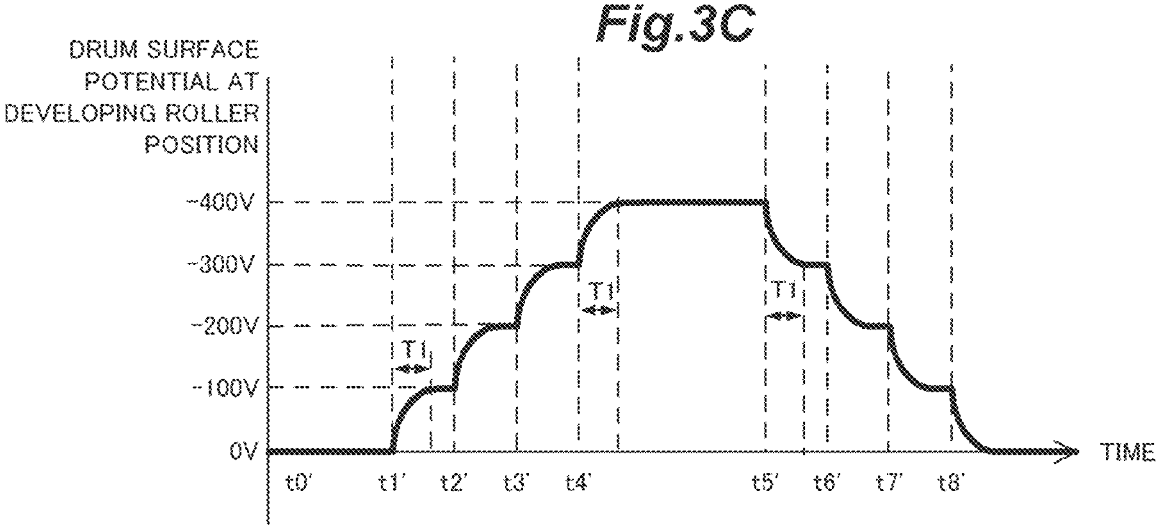

FIGS. 3C and 3D are timing charts showing change in voltage of the developing roller 121 and surface potential of the photosensitive drum 122 at the position of the developing roller 121, in a case of changing the surface potential of the photosensitive drum 122 at the position of the charging roller 123 as described above. FIG. 3C shows change in voltage of the developing roller 121. FIG. 3D shows change in the surface potential of the photosensitive drum 122 at the time of the surface of the photosensitive drum 122, which was at the position of the charging roller 123 at time tn (n=0, 1, 2, . . . ) in FIG. 3B reaching the position of the developing roller 121 at time tn'. The vertical axis in FIGS. 3C and 3D represents voltage or potential, and the horizontal axis represents time.

Bias of positive and negative polarity can be applied to the developing roller 121 according to the first embodiment as developing bias. At the point of origin (time t0') in the timing charts of FIGS. 3C and 3D, positive voltage of +150 V is applied to the developing roller 121, in order for the first potential difference Vback between the photosensitive drum 122 and the developing roller 121 to be 150 V, which is the target value in a state in which image formation can be performed. Time t1' is the timing at which the surface of the photosensitive drum 122 that was at the position of the charging roller 123 at time t1 in FIGS. 3A and 3B reaches the position of the developing roller 121. In the first embodiment, the interval between time t1 and time t1' is 100 msec (t1'−t1=100 msec). The developing voltage applied to the developing roller 121 at time t1' is changed by 100 V in the same way as the breadth of change in charging voltage applied at the charging roller 123, so as to be set to +50 V. At time t2' at which the amount of time T1 has elapsed from time t1', the voltage of the developing roller 121 is changed in the same way by 100 V, and set to −50 V. At time t3' at which the amount of time T1 has elapsed from time t2' the voltage of the developing roller 121 is set to −150 V. In the same way, at time t4' at which the amount of time T1 has elapsed from time t3', the voltage of the developing roller 121 is set to −250 V, and preparation at the developing roller 121 for realizing a state in which image formation can be performed is complete.

The voltages applied to the charging roller 123 and the developing roller 121 are changed stepwise. Accordingly, the breadth of change of the first potential difference Vback between the charging roller 123 and the developing roller 121 from 150 V is contained so as to be no more than 100 V from time to' to time t4' in FIGS. 3C and 3D. Accordingly, even when there is variance in the amount of time necessary for rising of voltage of the charging roller 123 and the developing roller 121 due to individual differences, the value of the first potential difference Vback can be contained within a range of 150 V+100 V and increase in the fogging toner amount can be suppressed.

Note that stepwise changing of the voltage applied to the charging roller 123 in the falling control in time t5 to t8 and time t5' to t8', in the same way as in the rising control described above, enables the value of the first potential difference Vback to be contained in a range in which fogging toner does not readily occur. Note, however, that in falling control, in addition to reducing the applied voltage of the charging roller 123, control is also performed to decay the charge on the photosensitive drum 122, by applying transfer bias, and by performing preexposure in which exposure is performed on the upstream side of the charging roller 123, for charge neutralization. The voltage control in the rising control and the falling control described above is an example and is not limited to the above example.

Estimation of Fogging Toner Amount

A method for estimating the fogging toner amount consumed at the time of startup of the image forming apparatus 100 will be described. In the first embodiment, assumption is made that the image forming apparatus 100 is stopped and is not performing image formation, due to interruption of image forming operations being performed during the previous time, and the fogging toner amount that is consumed when performing startup of the image forming apparatus 100 the next time is estimated.

In a case in which image forming operations are interrupted due to some reason, and falling control is not performed by the voltage control unit 230, there is a possibility that the value of the first potential difference Vback may not be able to be contained within the range of 150 V+100 V at the time of startup of the image forming apparatus 100 the next time. FIGS. 4A and 4B illustrate a region from the position of the charging roller 123 to the position of the developing roller 121 on the surface of the photosensitive drum 122 by hatching. The surface potential in this region cannot be controlled by voltage control of the developing roller 121 and the charging roller 123 at the time of startup of the image forming apparatus 100 the next time. Regardless of whether or not falling control is implemented, the surface potential of the photosensitive drum 122 decays over time, following the image forming operations of the previous time ending. Under the same conditions of elapse of time following image forming operations ending, there is a possibility that a great amount of fogging toner will be generated in a case in which falling control is not performed after the image forming operations the previous time as compared to a case in which falling control is performed, even when rising control is appropriately implemented at the time of the next startup. Note, however, that in a case in which the amount of time elapsed is sufficiently long, and the surface potential of the photosensitive drum 122 becomes 0, there will be no difference in fogging toner generated in accordance with whether or not falling control is implemented, and accordingly the above amount of time elapsed is an amount of time elapsed of a level such that the surface potential does not reach 0. Note that the configuration in the first embodiment is one in which rotation is started in a state where the developing roller 121 and the photosensitive drum 122 are in contact at the time of startup, and accordingly in a case in which falling control is not performed the previous time, unanticipated fogging toner can be generated at the time of startup the next time, depending on the stopped time. Accordingly, in the first embodiment, the fogging toner amount at the time of startup is estimated taking into consideration whether or not falling control was performed after image forming operations the previous time.

Specifically, the engine control unit 202 writes a value defined as follows, for example, in accordance with the operating state of the image forming apparatus 100, to a particular address in the nonvolatile memory 260.

00*h*: Image forming operations not being performed

01*h*: Image forming operations being performed

Timings at which judgment of "Image forming operations being performed" is made here is during execution of operations for forming an image on the photosensitive drum 122, operations of performing image formation (transfer) onto the recording medium 140, and rising control for preparation operations thereof or falling control for post-operations. With respect to rising control, judgment of image forming operations being performed is made from a timing at which the charging roller 123 starts rotating and charging is started. With respect to falling control, judgment of image forming operations being performed is made up to a timing at which charging of the charging roller 123 is in a stopped state and the charging roller 123 stops rotating. Accordingly, at the timing of the voltage control unit 230 starting rising control and the charging roller 123 starts rotation, the engine control unit 202 writes 01*h* to the above address in the nonvolatile memory 260. Note that either a configuration in which the charging roller 123 rotates by being driven by the photosensitive drum 122, or a configuration in which the charging roller 123 is rotationally driven by an independent driving device, may be used. Also, the engine control unit 202 writes 00*h* to the above address of the nonvolatile memory 260 at the time of completing falling control. In a case in which image forming operations are interrupted in a state in which falling control is not completed, the above address of the nonvolatile memory 260 is in a state of having 01*h* written thereto. Accordingly, in a case of the address in the nonvolatile memory 260 being referenced at the startup next time, and 01*h* being written thereto, judgment can be made that falling control was not completed the previous time. Thus, the cause of the image forming apparatus 100 stopping can be taken into consideration in the control.

The consumed-toner amount calculating unit 270 calculates the fogging toner amount consumed at the time of startup, using the fogging toner amount estimating unit 271. In a case in which falling control was not successfully performed when ending image forming operations at the previous time, the potential of the region from the position at which the charging roller 123 and the photosensitive drum 122 are in contact to the position at which the developing roller 121 and the photosensitive drum 122 are in contact cannot be controlled at the time of startup of the image forming apparatus 100. It is conceivable that a fogging toner amount that is consumed at the time of startup of the image forming apparatus 100 will be generated in accordance with the size of this potential-uncontrollable region (region indicated by hatching in FIGS. 4A to 4C). Accordingly, in a case in which falling control was not successfully performed following image forming operations the previous time, the fogging toner amount estimating unit 271 estimates the fogging toner amount (in increments of grams (g)) consumed at the time of startup of the image forming apparatus 100 the next time, by the following Expression 1.

$$\text{Fogging toner amount} = D1 \times L \times \alpha 1 \qquad \text{(Expression 1)}$$

D1 (in increments of millimeters (mm)) is the distance of the potential-uncontrollable region along the surface of the photosensitive drum 122 in a rotational direction (see FIG. 4A) and represents the size of the potential-uncontrollable region.

Figure 4C:
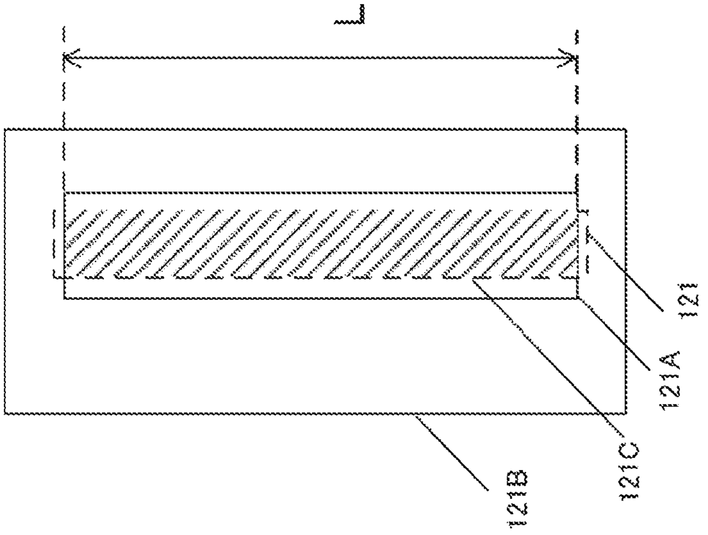
FIGS. 4A to 4C are enlarged views of the developing roller, a photosensitive drum, and the charging roller.
Figure 4A:
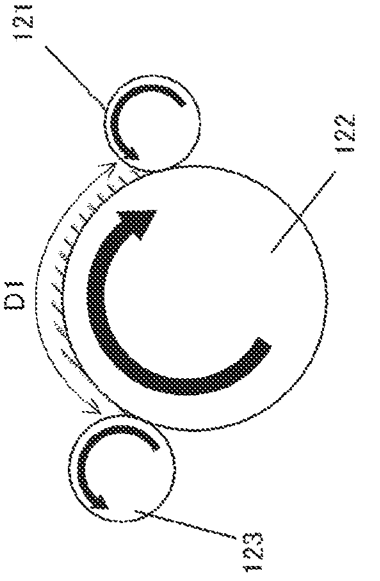
Figure 4B:
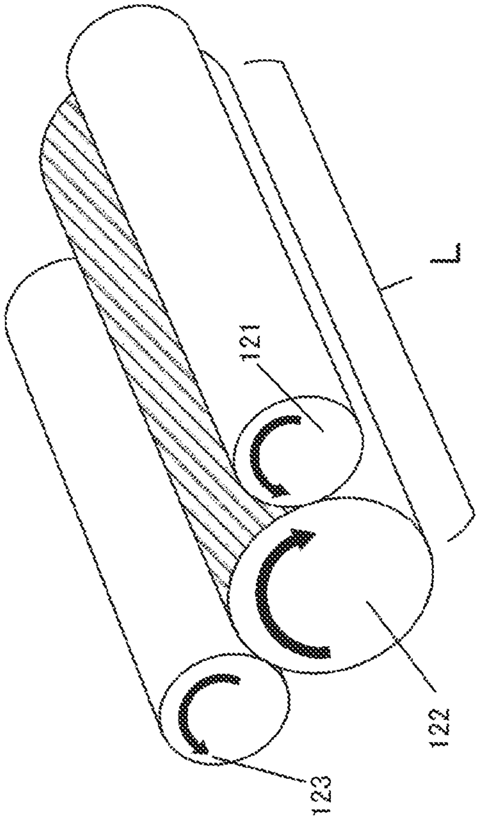

L (in increments of millimeters (mm)) is the length of a developing opening 121A of a toner container 121B in a rotation axis direction of the developing roller 121 (length of toner coating region 121C of the developing roller 121) (see FIGS. 4B and 4C). FIG. 4C is a conceptual diagram illustrating a relation between the developing opening 121A of the toner container 121B that rotatably supports the developing roller 121 and accommodates toner, and the developing roller 121. Toner within the toner container 121B is supplied from the developing opening 121A to the developing roller 121, and the surface of the developing roller 121 is coated with the toner. Accordingly, fogging is generated in the region toner coating region 121C (indicated by hatching in FIG. 4C) over the length of the developing opening 121A on the surface of the developing roller 121, in a longitudinal direction (rotation axis direction).

α1 (in increments of $g/mm^2$) is a coefficient found through experimentation.

In the first embodiment, $\alpha 1 = 3.0 \times 10^{-7}$ $mg/mm^2$, L=210 mm, and D1=18 mm.

Figure 5:
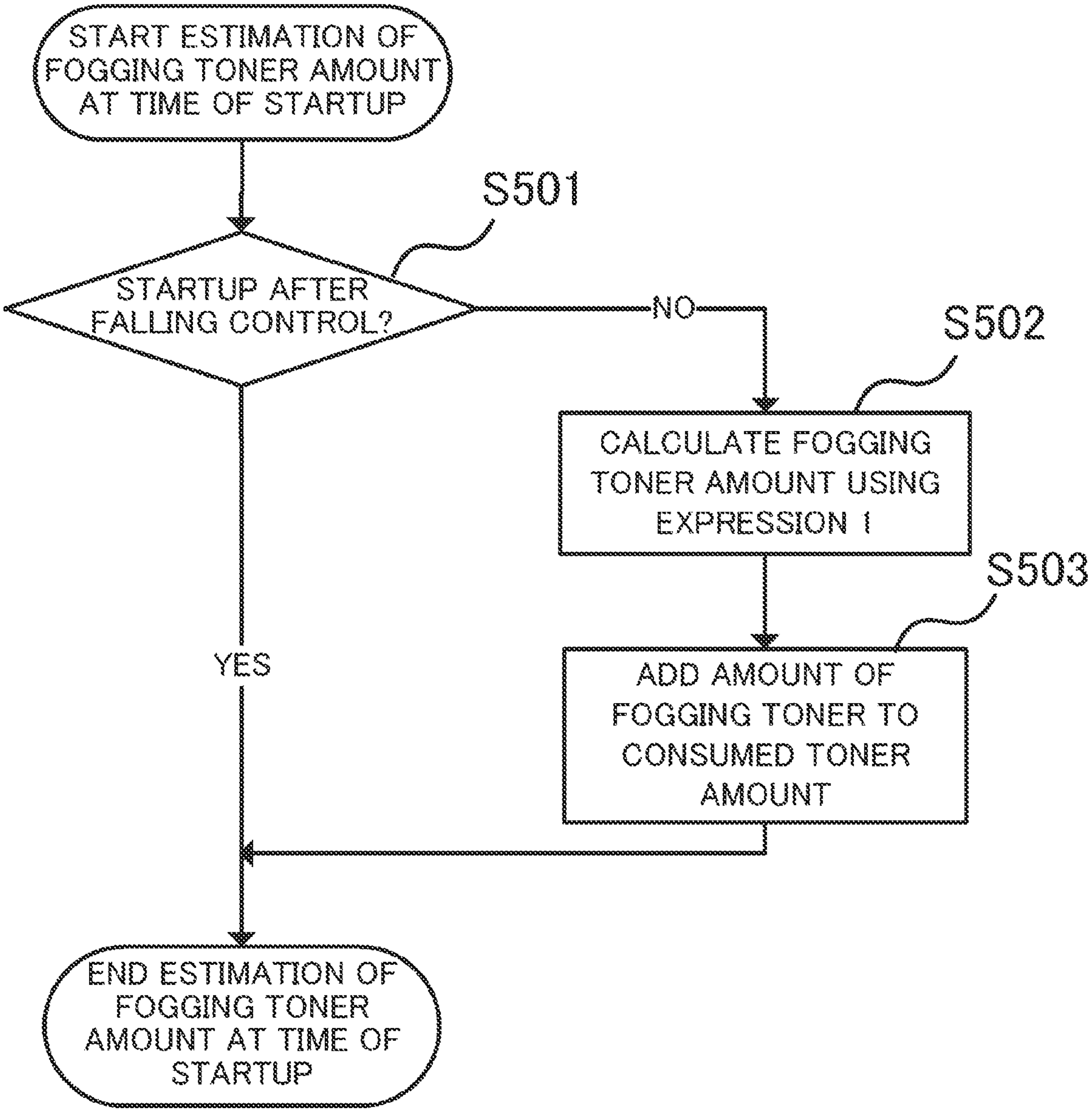
FIG. 5 is an estimation flowchart for fogging toner amount consumed at the time of startup in a first embodiment.

FIG. 5 is a flowchart showing processing for estimating the fogging toner amount consumed at the time of startup of the image forming apparatus 100 according to the first embodiment.

In step S501, the fogging toner amount estimating unit 271 determines whether or not falling control was performed following image forming operations the previous time. That is to say, at the time of rising of the image forming apparatus 100, the fogging toner amount estimating unit 271 determines whether the stopping the previous time was stopping following falling control or stopping due to interruption of image forming operations, by referencing the nonvolatile memory 260. In a case in which falling control was not performed (case in which cause of stopping was due to interruption of image forming operations) (No in S501), in step S502 the fogging toner amount estimating unit 271 calculates the fogging toner amount consumed at the time of startup, using Expression 1.

In step S503, the consumed-toner amount calculating unit 270 adds a value equivalent to the fogging toner amount calculated in step S502 to the consumed toner amount. Note that the fogging toner amount calculated here is an estimated value and does not necessarily match the actual fogging toner amount. Accordingly, the "adding" to the consumed toner amount here includes adding the fogging toner amount equivalency value calculated by Expression 1 to the actual toner consumption amount. The cumulative value of the consumed toner amount so far is stored in the nonvolatile memory 124 of the process cartridge 120, and the consumed-toner amount calculating unit 270 writes to the nonvolatile memory 124 the consumed toner amount updated by adding the fogging toner amount. Note that the cumulative value of the consumed toner amount may be stored in the nonvolatile memory 260 that the image forming apparatus 100 is equipped with.

As described above, in the first embodiment, in a case in which image forming operations were interrupted and falling control was not performed in the image forming apparatus 100, the fogging toner amount that will be consumed at the time of startup the next time is estimated and added to the toner consumption amount. Thus, the remaining toner amount can be estimated with good precision. Note that while the method of estimating the fogging toner amount at the time of startup by Expression 1 and adding to the toner consumption amount is exemplified in the first embodiment, the estimation method for the fogging toner amount is not limited to this example. As long as a value relating to the fogging toner amount is estimated, the fogging toner amount estimating unit 271 is not limited to estimating the fogging toner amount itself. Also, the calculation method of the toner consumption amount is not limited to adding a value relating to the fogging toner amount. For example, a uniform and constant amount may be added to the toner consumption amount as the portion for the fogging toner amount at the time of startup. Also, the amount to be calculated is not limited to the fogging toner amount, and an amount that is correlated with or related to the fogging toner amount may be calculated. For example, in a case in which a pixel count (dot count) is used for calculating the remaining toner amount, the fogging toner amount equivalency value may be calculated by converting into a pixel count and added to a pixel count calculated in remaining toner amount calculation processing. Also, the toner consumption amount may be multiplied by a predetermined coefficient to estimate the fogging amount at the time of startup.

Second Embodiment

In the second embodiment, a method of estimating the fogging toner amount consumed at the time of startup of the image forming apparatus 100, taking into consideration degree of deterioration of toner, elapsed time from stopping due to interruption of image forming operation to next startup, and ambient atmosphere, which are factors that causing the fogging toner amount to change, will be described. Configurations that are in common with the first embodiment will be omitted from the description below.

The fogging toner amount changes in accordance with the degree of deterioration of toner, and environmental conditions such as ambient humidity and so forth, besides the first potential difference Vback.

Toner is supplied to the developing roller 121 from the developing opening 121A of the toner container 121B illustrated in FIG. 4C, within the process cartridge 120. The toner within the toner container is agitated by an agitation sheet within the toner container, as long as the main motor 250 is being driven. Generally, toner deteriorates due to being agitated, which affects polarity of the toner. The polarity of the toner affects the fogging toner amount. When the main motor 250 is driven, the engine control unit 202 writes a value corresponding to the number of times of agitation (hereinafter referred to as "rubbing count") as an indicator of the degree of deterioration of the toner, to the nonvolatile memory 124 of the process cartridge 120. In the second embodiment, the fogging toner amount estimating unit 271 acquires information of the rubbing count from the nonvolatile memory 124 and estimates the fogging toner amount at the time of startup on the basis of the rubbing count.

Also, in a case in which image forming operations are interrupted, the first potential difference Vback immediately following the interruption is the value during image formation. The surface potential of the photosensitive drum 122 falls as time elapses after interruption of the image forming operations, and eventually the first potential difference Vback becomes 0 V. For example, in a state in which charging bias of −1000 V is applied, and the image forming operations are interrupted in this state, the developing bias becomes 0 V, and the first potential difference Vback changes from 150 V to 400 V. Thereafter, the surface potential of the photosensitive drum 122 gradually decays and becomes 0 V, and the first potential difference Vback also becomes 0 V. In a case in which image forming operations are interrupted, the stopped time measurement unit 280 (see FIG. 2) measures the elapsed time from the stopping (hereinafter referred to as "stopped time") and stops measurement upon startup being performed again. Accordingly, in the second embodiment, the fogging toner amount estimating unit 271 estimates the fogging toner amount at the time of startup on the basis of stopped time measured by the stopped time measurement unit 280.

Note that the consumed toner amount due to regular fogging from toner charged to regular polarity (negative polarity in the first embodiment, negative toner) tends to exhibit a smaller fogging toner amount the greater the rubbing count is and the more deteriorated the toner is. Also, the longer the stopped time is, the smaller the fogging toner amount tends to be consumed at the time of startup the next time. Conversely, toner that is charged to the inverse polarity (positive polarity in the second embodiment, positive toner) tends to exhibit a smaller charge of toner the greater the rubbing count is, and accordingly inverse fogging due to positive toner tends to be greater the greater the rubbing count is. This also tends to be greater the longer the stopped time is. When the stopped time is long, the charge of toner remaining on the developing roller 121 (toner following having passed a developing blade, which will not pass the developing blade at the time of startup) decays and becomes small (shifts to positive side).

In the second embodiment, the estimation value of fogging toner amount based on the rubbing count and stopped time is adjusted in accordance with whether the environment or configuration is such that regular fogging by regularly polarized toner readily occurs, or the environment or configuration is such that inverse fogging by toner charged to inverse polarity readily occurs. For example, under conditions in which regular fogging readily occurs, the greater the rubbing count is, the smaller the fogging toner amount at the time of startup is estimated to be, and the longer the stopped time is, the smaller the fogging toner amount at the time of startup is estimated to be. Also, under conditions in which inverse fogging readily occurs, the greater the rubbing count is, and the longer the stopped time is, the greater the fogging toner amount at the time of startup the next time (inverse fogging toner amount) is estimated to be.

Also, the fogging toner amount at the time of startup changes in accordance with environmental conditions such as temperature, humidity, and so forth. The environmental sensor 141 (see FIG. 2) measures predetermined environmental conditions regarding the image forming apparatus 100. In the second embodiment, the fogging toner amount estimating unit 271 estimates the fogging toner amount at the time of startup in accordance with the environmental conditions measured by the environmental sensor 141. The relation between the environmental conditions and the fogging toner amount is dependent on the type of environmental conditions, the physical properties of the toner, and so forth, and accordingly information of the relation between environmental conditions and fogging toner amounts is found in advance through experimentation and stored in the nonvolatile memory 260.

In the second embodiment, the relation between the rubbing count, stopped time, and environmental conditions, and the coefficient $\alpha 1$ to be used in Expression 1 for estimating the fogging toner amount, is found in advance, and stored in the nonvolatile memory 260 as a table such as shown in FIG. 7. The fogging toner amount estimating unit 271 references the table in FIG. 7 and decides the coefficient $\alpha 1$ on the basis of the rubbing count acquired from the nonvolatile memory 124, the stopped time measured by the stopped time measurement unit 280, and the environmental conditions measured by the environmental sensor 141. The coefficient $\alpha 1$ that is decided is then used to calculate the fogging toner amount by Expression 1.

Figure 6:
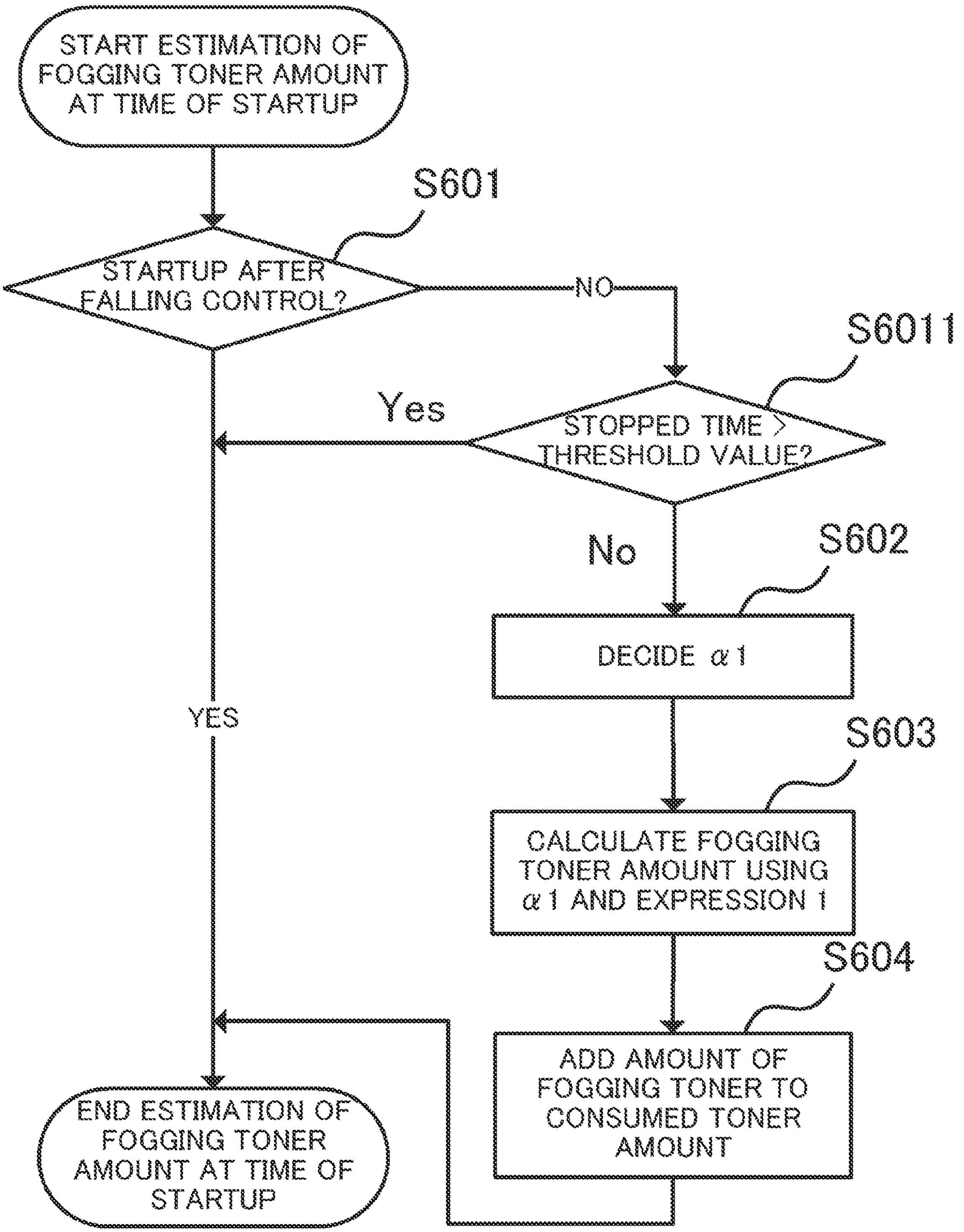
FIG. 6 is an estimation flowchart for fogging toner amount consumed at the time of startup in a second embodiment.

FIG. 6 is a flowchart showing processing for estimating the fogging toner amount consumed at the time of startup of the image forming apparatus 100 in the second embodiment.

In step S601, the fogging toner amount estimating unit 271 determines whether or not falling control was performed after image forming operations the previous time. That is to say, the fogging toner amount estimating unit 271 determines the cause of stopping of the image forming apparatus 100 the previous time. In a case in which falling control was not performed (No in S601), the processing of S6011 is executed. In step S6011, the fogging toner amount estimating unit 271 determines whether the elapsed time from when stopping the previous time (stopped time) exceeds a threshold value. In a case in which the stopped time exceeds the threshold value, the surface potential of the photosensitive drum 122 has fallen all the way, and unanticipated fogging will not occur. Accordingly, there is no need to estimate the fogging toner amount at the time of startup, and thus the processing of this flowchart ends. Conversely, in a case in which the stopped time is no greater than the threshold value, the surface potential of the photosensitive drum 122 is in a state of not being controlled, and there is a possibility that unanticipated fogging will occur. Thus, the following estimation processing of the fogging toner amount is executed.

In step S602, the consumed-toner amount calculating unit 270 decides the coefficient $\alpha 1$. Note that in a case in which the stopped time exceeds the threshold value, the coefficient $\alpha 1$ may be decided to be 0, for example, or may be set to be a value that is smaller as compared to a case in which the threshold value is not exceeded. In step S603, the consumed-toner amount calculating unit 270 then calculates the fogging toner amount using Expression 1. In step S604, the consumed-toner amount calculating unit 270 adds the consumed fogging toner that is estimated to the consumed toner.

As described above, in the second embodiment, in a case in which the image forming operations of the image forming apparatus 100 were interrupted and falling control was not performed, the fogging toner amount that will be consumed at the time of startup the next time is estimated and added to the toner consumption amount. Further, in the estimation of the fogging toner amount, taking into consideration the degree of deterioration of toner, the environmental conditions, and stopped time in a case of startup following interruption of image forming operations, enables the fogging toner amount that will be consumed at the time of startup to be estimated with greater precision. Hence, the remaining toner amount can be estimated with good precision. Note that while description has been made in the second embodiment regarding a method of estimating the fogging toner amount on the basis of the three conditions of rubbing count, environmental conditions, and stopped time, the fogging toner amount may be estimated on the basis of any one of these conditions, or a combination of any two thereof.

Third Embodiment

The image forming apparatus 100 in the first and second embodiments has a configuration without development contact and separation mechanism, in which the developing roller 121 and the photosensitive drum 122 are in contact even when not performing image forming operations. Accordingly, fogging toner is consumed at the time of driving the developing roller 121 and the photosensitive drum 122 during rising control, falling control, and other such times when not performing image formation.

In the third embodiment, an estimation method for the fogging toner amount when executing rising control will be described as estimation of the fogging toner amount when not performing image formation.

In the third embodiment, in a case in which falling control has been performed after the image forming operations the previous time, the fogging toner amount (in increments of grams (g)) in the rising control the next time is estimated by the following Expression 2.

$$\text{Fogging toner amount} = D2 \times L \times \alpha 2 \qquad \text{(Expression 2)}$$

D2 (in increments of millimeters (mm)) is the distance in the rotation direction along the surface of the photosensitive drum 122 that passes over the developing roller 121 in the rising control (hereinafter referred to as "driving distance") and represents the driving amount of the photosensitive drum 122 in the rising control.

L (in increments of millimeters (mm)) is the length of the developing opening 121A of the toner container 121B in the rotation axis direction of the developing roller 121 (length of the toner coating region 121C of the developing roller 121) (see FIGS. 4B and 4C).

$\alpha 2$ (in increments of g/mm$^2$) is a coefficient found through experimentation.

The coefficient $\alpha 2$ is found through experimentation, the same way as with the coefficient $\alpha 1$ in Expression 1. The coefficient $\alpha 2$ in the second embodiment may be decided on the basis of rubbing count, environmental conditions, and so forth, in the same way as with the coefficient $\alpha 1$.

Meanwhile, the surface potential of the photosensitive drum 122 decays over passage of time after the image forming operations of the previous time end, regardless of whether or not falling control is implemented, in the same way as in the first embodiment. Under the same conditions of elapse of time after image forming operations ending, there is a possibility that a great amount of fogging toner will be generated in a case in which falling control is not performed after the image forming operations the previous time as compared to a case in which falling control is performed, even when rising control is appropriately implemented at the time of the next startup. Note, however, that in a case in which the amount of time elapsed is sufficiently long, and the surface potential of the photosensitive drum 122 becomes 0, there will be no difference in fogging toner generated in accordance with whether or not falling control is implemented, and accordingly the above amount of time elapsed is an amount of time elapsed of a level such that the surface potential does not become 0. Note that the configuration in the third embodiment is one in which rotation is started in a state where the developing roller 121 and the photosensitive drum 122 are in contact at the time of startup, and accordingly in a case in which falling control is not performed the previous time, fogging toner will occur at the time of startup the next time. In the third embodiment, out of the fogging toner amount in the rising control the next time, the fogging toner amount that occurs in the potential-uncontrollable region described in the first embodiment is calculated using the coefficient $\alpha 1$ and the length D1 of the potential-uncontrollable region. Also, the driving distance D2 of the photosensitive drum 122 in the rising control is longer than the length D1 of the potential-uncontrollable region. The fogging toner amount that occurs other than in the potential-uncontrollable region is calculated using, out of the coefficient $\alpha 2$ and the driving distance D2, the amount of the distance D2 that exceeds the length D1 of the potential-uncontrollable region, i.e., D2 minus D1 (D2-D1). Accordingly, the fogging toner amount (in increments of grams (g)) in the rising control the next time, in a case in which falling control has not been performed after the image forming operations the previous time, is estimated by the following Expression 3.

$$\text{Fogging toner amount} = (D2 - D1) \times L \times \alpha 2 + D1 \times L \times \alpha 1 \ (\text{where } D2 > D1) \qquad \text{Expression 3}$$

Note that while the length D1 of the potential-uncontrollable region is a constant that is determined by the dimensions and layout of the developing roller 121, the photosensitive drum 122, and the charging roller 123 in the image forming apparatus 100, the driving distance D2 at the time of rising control is a variable control parameter in the rising control. Note that in a case in which the stopped time from the previous time is sufficiently long, and the charge in the potential-uncontrollable region has sufficiently decayed, the cause of fogging toner being generated may be deemed only to be in the region of the driving distance D2, and calculation may be performed with D1=0.

Figure 8:
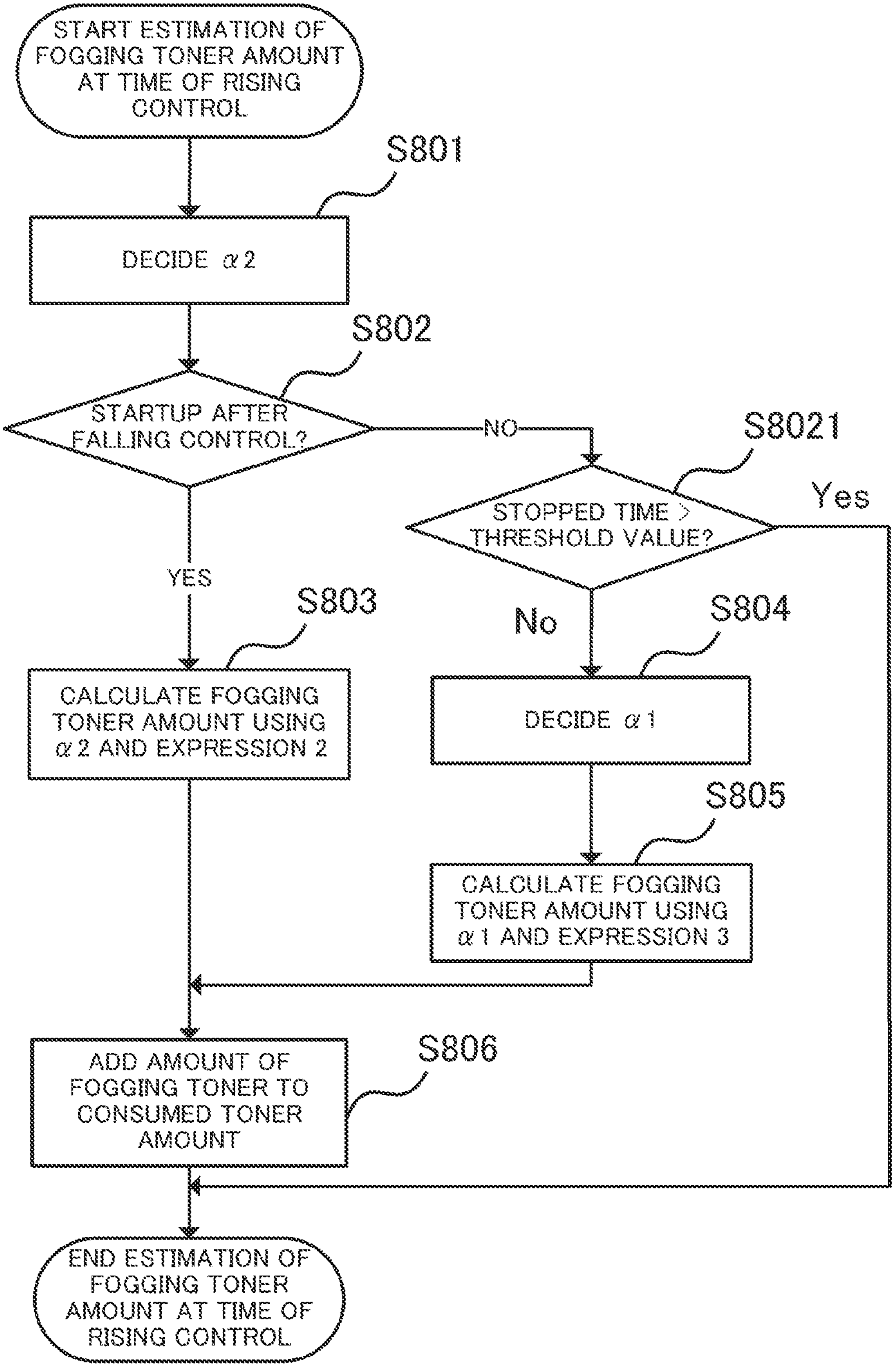
FIG. 8 is an estimation flowchart for fogging toner amount consumed at the time of rising control in a third embodiment.

FIG. 8 is a flowchart showing processing for estimating fogging toner amount consumed at the time of rising control by the voltage control unit 230 in the third embodiment.

Upon the rising control starting, in step S801, the fogging toner amount estimating unit 271 decides the coefficient α2.

In step S802, the fogging toner amount estimating unit 271 determines whether or not falling control was performed after the image forming operations the previous time. That is to say, the fogging toner amount estimating unit 271 references the nonvolatile memory 260 and determines whether the stopping of the previous time was stopping after falling control or stopping by interruption of image forming operations. In a case in which falling control has been performed (in a case in which the stopping of the previous time was stopping after falling control) (Yes in S802), in step S803 the fogging toner amount estimating unit 271 calculates the fogging toner amount by Expression 2. Conversely, a case in which falling control has not been performed (in a case in which the cause of stopping the previous time was stopping due to interruption of the image forming operations) (No in S802), the processing of step S8021 is executed.

In step S8021, the fogging toner amount estimating unit 271 determines whether the elapsed time from when stopping the previous time (stopped time) exceeds a threshold value. In a case in which the stopped time exceeds the threshold value, the surface potential of the photosensitive drum 122 has fallen all the way, and unanticipated fogging will not occur. Accordingly, there is no need to estimate the fogging toner amount at the time of startup, and thus the processing of this flowchart ends. Conversely, in a case in which the stopped time is no greater than the threshold value, the surface potential of the photosensitive drum 122 is in a state of not being controlled, and there is a possibility that unanticipated fogging will occur. Accordingly, the following estimation processing for fogging toner amount is executed. In step S804, the fogging toner amount estimating unit 271 decides the coefficient α1. Then in step S805, the fogging toner amount estimating unit 271 calculates the fogging toner amount by Expression 3.

In step S806, the consumed-toner amount calculating unit 270 adds the fogging toner amount calculated in step S803 or in step S805 to the consumed toner.

As described above, in the third embodiment, taking into consideration the fogging toner amount consumed when not performing image formation enables the toner consumption amount to be estimated with good precision, and hence enables the remaining toner amount to be estimated with good precision. In the third embodiment, the fogging toner amount at the time of rising control is estimated on the basis of whether or not falling control was executed when image forming operations were stopped the previous time (whether or not stopping due to interruption of image forming operations being performed). Accordingly, the fogging toner amount can be estimated with better precision. Note that while the method of estimating the fogging toner amount at the time of executing rising control is described in the third embodiment, the fogging toner amount may be estimated at the time of executing falling control for when not performing image formation, and may be added to the consumed toner amount, in the same way. The fogging toner amount when executing falling control can be estimated by using a driving distance D3 that represents the driving amount of the photosensitive drum 122 in falling control, instead of the driving distance D2, in Expression 2.

Fourth Embodiment

In the fourth embodiment, description will be made regarding a method for estimating the fogging toner amount consumed when not performing image formation, after image forming operations, in accordance with a voltage control sequence that is executed, when executing a voltage control sequence that is different from normal falling control at the time of falling control after image forming operations.

In addition to having the configuration of the third embodiment, the image forming apparatus 100 according to the fourth embodiment also performs charging roller cleaning, which is a maintenance operation of the image forming apparatus 100, as necessary at the time of falling control, in order to prepare for the image forming operations the next time. Specifically, voltage of positive polarity and voltage of negative polarity are applied to the surface potential of the photosensitive drum 122 at predetermined timings. In a case of executing charging roller cleaning, a voltage control sequence that is different from the normal falling control of the surface potential of the photosensitive drum 122 is executed, and accordingly fogging toner of a different amount from that of normal falling control is generated. In a case in which image forming operations end, and charging roller cleaning is necessary, the voltage control unit 230 executes the charging roller cleaning that is a different voltage control sequence from the normal falling control sequence.

In the fourth embodiment, in a case of executing a voltage control sequence that differs from normal falling control at the time of falling control with respect to the developing roller 121 and the charging roller 123, the coefficient α2 is decided in accordance with the voltage control sequence. The fogging toner amount at the time of falling control is calculated by Expression 2, using this coefficient α2. In the fourth embodiment, the relation between the type of the voltage control sequence and the coefficient α2 for Expression 2 used for estimating the fogging toner amount at the time of falling control is found in advance through experimentation and is stored in the nonvolatile memory 260 as a table such as shown in FIG. 10. Note that the coefficient α2 corresponding to each voltage control sequence may be decided on the basis of rubbing count, environmental conditions, and so forth, in the same way as in the second embodiment.

The fogging toner amount estimating unit 271 references the table in FIG. 10 and decides the coefficient α2 in accordance with the type of voltage control sequence that is executed by the voltage control unit 230 in the falling control. The coefficient α2 that is decided upon is then used to calculate the fogging toner amount at the time of falling control, from Expression 2.

Figure 9:
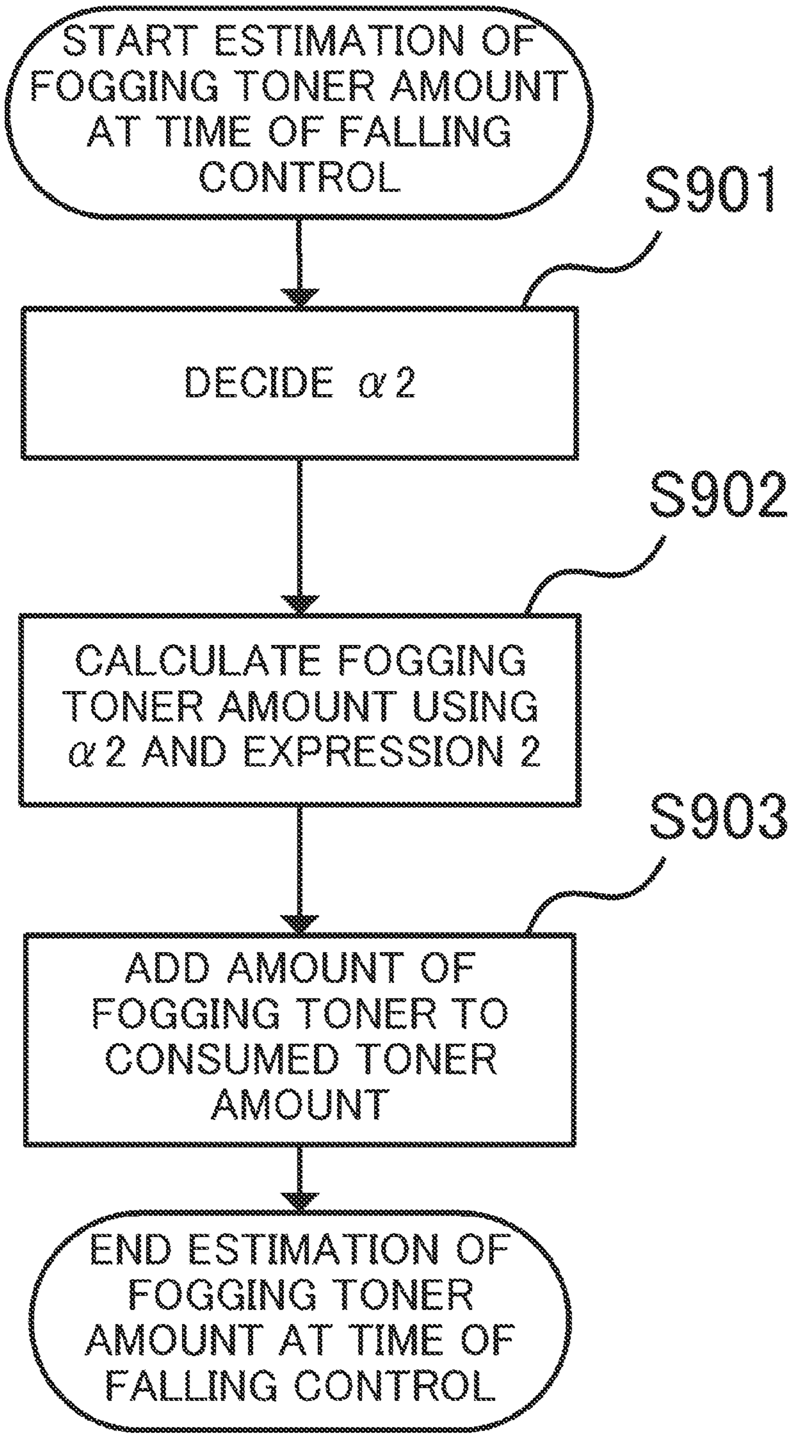
FIG. 9 is an estimation flowchart for fogging toner amount consumed at the time of falling control in a fourth embodiment.

FIG. 9 is a flowchart showing processing for estimating the fogging toner consumed at the time of falling control in the fourth embodiment.

Upon the falling control starting, in step S901 the fogging toner amount estimating unit 271 decides the coefficient α2.

In step S902, the fogging toner amount estimating unit 271 calculates the fogging toner amount by Expression 2, using the coefficient α2 decided in step S901.

In step S903, the consumed-toner amount calculating unit 270 adds the consumed fogging toner amount that is calculated in step S902 to the consumed toner.

As described above, in the fourth embodiment, fogging toner that is consumed when not performing image formation is estimated in accordance with the voltage control sequence executed when not performing image formation, which enables the fogging toner amount to be estimated with even better precision, and hence enables the remaining toner amount to be estimated with good precision. While an example of charging roller cleaning at the time of falling control is described in the fourth embodiment, as an example of a voltage control sequence when not performing image formation, the voltage control sequence is not limited to this.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064522, filed on Apr. 11, 2023, which is hereby incorporated by reference herein in its entirety.

What is claimed is:

1. An image forming apparatus including:

a photosensitive drum that bears an electrostatic latent image;

a charging roller that charges the photosensitive drum;

a developing roller that develops by toner the electrostatic latent image formed on the photosensitive drum;

a control unit that controls to start rotation of the photosensitive drum and the developing roller in a state of being in contact with each other; and an estimating unit configured to estimate a value relating to an amount of toner consumption, wherein the estimating unit estimates the value relating to the amount of toner consumption on the basis of a value relating to an amount of toner that is consumed in a case in which the photosensitive drum and the developing roller are driven in the state of being in contact with each other at a time of startup of the image forming apparatus.

2. The image forming apparatus according to claim 1, wherein the time of startup of the image forming apparatus is a time of next startup in a case in which previous stopping of an image forming operation is stopping due to interruption of an image forming operation that is being performed.

3. The image forming apparatus according to claim 1, wherein the time of startup of the image forming apparatus is a time of next startup in a case in which previous stopping of an image forming operation is stopping due to interruption of image forming operation that is being performed, and also in which an elapsed time from the previous stopping is no greater than a threshold value.

4. The image forming apparatus according to claim 1, wherein the time of startup of the image forming apparatus is a time of rising control execution in which voltage applied to the charging roller and the developing roller is controlled to cause the charging roller, the photosensitive drum, and the developing roller, which are in a standby state, to transition into a state of being capable of image forming.

5. The image forming apparatus according to claim 4, wherein the estimating unit estimates a value relating to an amount of toner that is consumed at the time of the rising control on the basis of a driving amount of the photosensitive drum in the rising control.

6. The image forming apparatus according to claim 5, wherein the estimating unit estimates the value relating to the amount of toner that is consumed at the time of the rising control, further on the basis of whether or not falling control in which voltage applied to the charging roller and the developing roller is controlled to cause the charging roller and the developing roller, which are in the state of being capable of image forming, to transition into the standby state, has been executed at a time of previous stopping of an image forming operation.

7. The image forming apparatus according to claim 6, wherein, in the falling control, voltage applied to the charging roller and the developing roller is changed to a target voltage in a stepwise manner.

8. The image forming apparatus according to claim 4, wherein, in the rising control, voltage applied to the charging roller and the developing roller is changed to a target voltage in a stepwise manner.

9. The image forming apparatus according to claim 1, wherein the time of startup of the image forming apparatus is a time of falling control execution in which voltage applied to the charging roller and the developing roller is controlled to cause the charging roller, the photosensitive drum, and the developing roller, which are in a state of being capable of image forming, to transition into a standby state.

10. The image forming apparatus according to claim 9, wherein the estimating unit estimates a value relating to an amount of toner that is consumed at the time of the falling control on the basis of a driving amount of the photosensitive drum in the falling control.

11. The image forming apparatus according to claim 10, wherein the estimating unit estimates the value relating to the amount of toner that is consumed at the time of the falling control, further on the basis of voltage control of the charging roller and the developing roller executed at the time of the falling control.

12. The image forming apparatus according to claim 1, wherein the estimating unit estimates the value relating to the amount of toner that is consumed at the time of startup of the image forming apparatus on the basis of a size of a region on a surface of the photosensitive drum from a position at which the charging roller and the photosensitive drum are in contact to a position at which the developing roller and the photosensitive drum are in contact.

13. The image forming apparatus according to claim 1, wherein the estimating unit estimates a value relating to a remaining amount of toner at the developing roller on the basis of a value relating to an initial toner amount and a cumulative value of the value relating to the amount of toner consumption.

14. The image forming apparatus according to claim 1, wherein the estimating unit estimates the value relating to the amount of toner consumption, on the basis of a value relating to an amount of toner adhering to an image region of the photosensitive drum and an amount of toner adhering to a non-image region, when performing image forming, and a value relating to an amount of toner that is consumed in a case in which the photosensitive drum and the developing roller are driven in the state of being in contact with each other at the time of startup of the image forming apparatus.

15. The image forming apparatus according to claim 1, wherein the estimating unit estimates the value relating to the amount of toner that is consumed at a time of startup of the image forming apparatus on the basis of a degree of deterioration of the toner.

16. The image forming apparatus according to claim 1, wherein the estimating unit estimates the value relating to the amount of toner that is consumed at a time of startup of the image forming apparatus on the basis of an elapsed time from the previous stopping of the image forming operation.

17. The image forming apparatus according to claim 1, wherein the estimating unit estimates the value relating to the amount of toner that is consumed at a time of startup of the image forming apparatus on the basis of whether or not the previous stopping of an image forming operation is stopping due to interruption of an image forming operation that is being performed.

18. The image forming apparatus according to claim 1, further comprising:

an environmental sensor that measures environmental conditions of surroundings of the image forming apparatus, wherein the estimating unit estimates the value relating to the amount of toner that is consumed at a time of startup of the image forming apparatus on the basis of the environmental conditions measured by the environmental sensor.

19. The image forming apparatus according to claim 1, wherein the developing roller and the photosensitive drum are driven in the state of being in contact with each other at all times.

20. An image forming apparatus including:

a photosensitive drum that bears an electrostatic latent image;

a charging roller that charges the photosensitive drum;

a developing roller that develops by toner the electrostatic latent image formed on the photosensitive drum;

a control unit that controls to start rotation of the photosensitive drum and the developing roller in a state of being in contact with each other; and an estimating unit configured to estimate a value relating to an amount of toner consumption, wherein the estimating unit estimates the value relating to the amount of toner consumption, on the basis of a value relating to an amount of toner that is consumed in a case in which the photosensitive drum and the developing roller are driven in the state of being in contact with each other at a time of rotation after an image forming operation onto a recording medium ends.

* * * * *